No. 879,958. PATENTED FEB. 25, 1908.
S. E. GUTRIDGE & J. F. BAKER.
NUT RETAINER.
APPLICATION FILED APR. 20, 1907.

Witnesses
Benj. Finckel
Alice B. Cook.

Inventors
Stephen E. Gutridge
John F. Baker
By Finckel & Finckel
Attorneys.

THE NORRIS PETERS CO., WASHINGTON, D. C.

UNITED STATES PATENT OFFICE.

STEPHEN E. GUTRIDGE AND JOHN F. BAKER, OF NEWARK, OHIO.

NUT-RETAINER.

No. 879,958.  Specification of Letters Patent.  Patented Feb. 25, 1908.

Application filed April 20, 1907. Serial No. 369,255.

*To all whom it may concern:*

Be it known that we, STEPHEN E. GUTRIDGE and JOHN F. BAKER, citizens of the United States, residing at Newark, in the county of Licking and State of Ohio, have invented a certain new and useful Improvement in Nut-Retainers, of which the following is a specification.

The object of this invention is to provide an improved construction of devices of simple and economical form for securing nuts and bolts from accidental removal and for insuring permanent tightness in parts bolted together.

The invention consists in the construction and combination of parts hereinafter described and claimed, the invention not being confined to precisely the forms of the parts shown.

Figure 1:
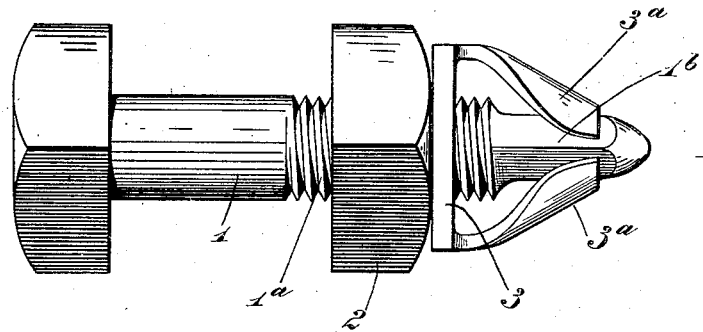
Figure 2:
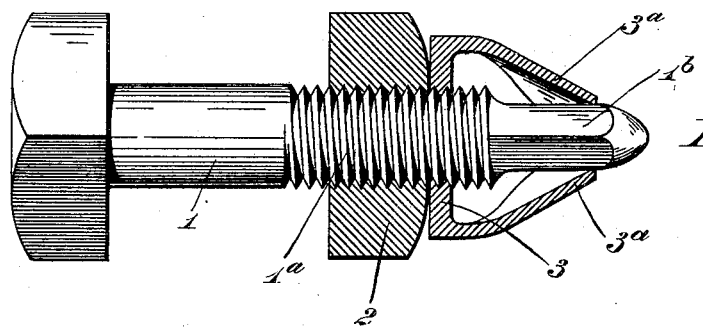
Figure 3:
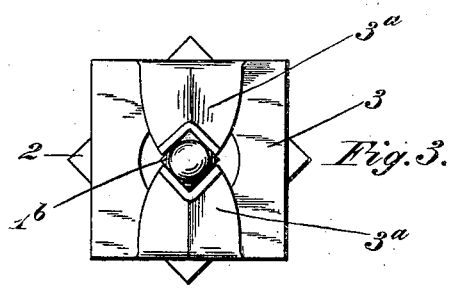

In the accompanying drawings—Figure 1 is a side elevation of the parts assembled; Fig. 2 is a longitudinal sectional view of the end of the bolt showing also the nut and jam in section; Fig. 3 is an end view looking toward the outer side of the jam.

In the views 1 designates a headed bolt provided with a shank partially threaded, as seen at 1$^a$, but having its end reduced and made square or non-circular in cross section, as seen at 1$^b$. The character 2 designates the ordinary nut to turn on the thread of the bolt as usual.

The jam nut, as particularly shown, consists of a body portion 3 threaded to turn on the bolt against the nut 2 to jam or lock it from rotation, said body portion being provided with shanked fingers 3$^a$ extending laterally from the body portion that reach outward and embrace the square or non-circular reduced end of the bolt. The fingers 3$^a$ are each bent longitudinally to engage the corners of the reduced end of the bolt. Said fingers 3$^a$ are also made elastic but are sufficiently stiff to require considerable force to turn the jam and the fingers from one angle to the next and the jam up against the nut. It follows, therefore, that although the jam can, by the application of a suitable wrench and power, be turned off to permit the removal of the nut and bolt, the said jam cannot be jolted off or accidentally removed.

What we claim and desire to secure by Letters Patent is:

1. The combination with a threaded bolt having an unthreaded end square in cross section to form flat surfaces and longitudinal corners, a threaded jam-nut on the thread of the bolt, said jam-nut having a shanked elastic finger extending longitudinally from the face of the nut and in a plane at right angles to said face to yieldingly press laterally upon the unthreaded end of the bolt, said finger having its free end bent to form an angular surface for engagement with the corners of the bolt end to normally hold the nut in adjusted position on the bolt, said finger being adapted to ride transversely over said corners and constantly engage the bolt end when the nut is rotated to adjust or remove the same.

2. The combination with a threaded bolt having an unthreaded end square in cross section to form flat surfaces and longitudinal corners, a threaded jam-nut on the thread of the bolt, said jam-nut having shanked elastic fingers extending longitudinally from the face of the nut and in a plane at right angles to said face to yieldingly press laterally upon the unthreaded end of the bolt, said fingers having their ends bent to form angular surfaces for engagement with the corners of the bolt end to normally hold the nut in adjusted position on the bolt, said fingers being adapted to ride transversely over said corners and constantly engage the bolt end when the nut is rotated to adjust or remove the same.

STEPHEN E. GUTRIDGE.
JOHN F. BAKER.

Witnesses to both signatures:
HOOPER FRANKLIN,
JOSEPH RENZ.